United States Patent
Vetter

(10) Patent No.: US 11,317,267 B2
(45) Date of Patent: Apr. 26, 2022

(54) SYSTEMS AND METHODS FOR RETROFIT WIRELESS COMMUNICATIONS IN POWER TOOLS

(71) Applicant: HILTI AKTIENGESELLSCHAFT, Schaan (LI)

(72) Inventor: Marc Vetter, Buchs (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 17/252,893

(22) PCT Filed: Jun. 17, 2019

(86) PCT No.: PCT/EP2019/065842
§ 371 (c)(1),
(2) Date: Dec. 16, 2020

(87) PCT Pub. No.: WO2019/243237
PCT Pub. Date: Dec. 26, 2019

(65) Prior Publication Data
US 2021/0266718 A1    Aug. 26, 2021

Related U.S. Application Data

(60) Provisional application No. 62/688,462, filed on Jun. 22, 2018.

(51) Int. Cl.
*H04W 4/80*    (2018.01)
*H04W 4/38*    (2018.01)
*B25F 5/02*    (2006.01)

(52) U.S. Cl.
CPC ............ *H04W 4/80* (2018.02); *B25F 5/02* (2013.01); *H04W 4/38* (2018.02)

(58) Field of Classification Search
CPC .............. B25F 5/00; H04W 4/38; H04W 4/80
See application file for complete search history.

(56) References Cited

U.S. PATENT DOCUMENTS 9,559,755 B2 *   1/2017   Breitenbach ............. B25F 5/02
9,700,997 B2 *   7/2017   Schlegel ................. B25B 21/00
(Continued)

FOREIGN PATENT DOCUMENTS

| DE | 102015225841 A1 | 6/2017 |
| DE | 102015226089 A1 | 6/2017 |
| WO | WO 2016/168787 A1 | 10/2016 |

OTHER PUBLICATIONS

International Search Report in International Application No. PCT/EP2019/065842, dated Sep. 26, 2019.

*Primary Examiner* — David Bilodeau
(74) *Attorney, Agent, or Firm* — Leydig Voit & Mayer, Ltd.

(57) ABSTRACT

A power tool system includes a power tool configured to receive an input power via a cable from a power source. The power tool system also includes a communications system disposed within the power tool. The communications system includes communications circuitry configured to receive operating information related to the power tool. The power tool system includes a retrofit tag removably coupled to an external surface of a housing of the power tool. The retrofit tag is configured to wirelessly couple with the communications system to receive at least a portion of the operating information with a first wireless communication mode. The retrofit tag is configured to transmit at least a portion of the operating information with a second wireless communication mode. The first wireless communication mode is different than the second wireless communication mode.

17 Claims, 6 Drawing Sheets

(56) References Cited

U.S. PATENT DOCUMENTS

| | | | |
|---|---|---|---|
| 2006/0179473 A1* | 8/2006 | Innami | B25F 5/00 726/2 |
| 2008/0252446 A1* | 10/2008 | Dammertz | B25F 5/02 340/539.27 |
| 2010/0096151 A1 | 4/2010 | Ostling | |
| 2014/0184397 A1* | 7/2014 | Volpert | B25F 5/00 340/12.51 |
| 2014/0240125 A1 | 8/2014 | Burch et al. | |
| 2016/0342151 A1* | 11/2016 | Dey, IV | H04L 67/125 |
| 2016/0375570 A1* | 12/2016 | Boeck | H02P 6/00 700/169 |
| 2017/0014984 A1 | 1/2017 | Rola et al. | |
| 2018/0017191 A1 | 1/2018 | Love et al. | |
| 2018/0062873 A1 | 3/2018 | Chang et al. | |

* cited by examiner

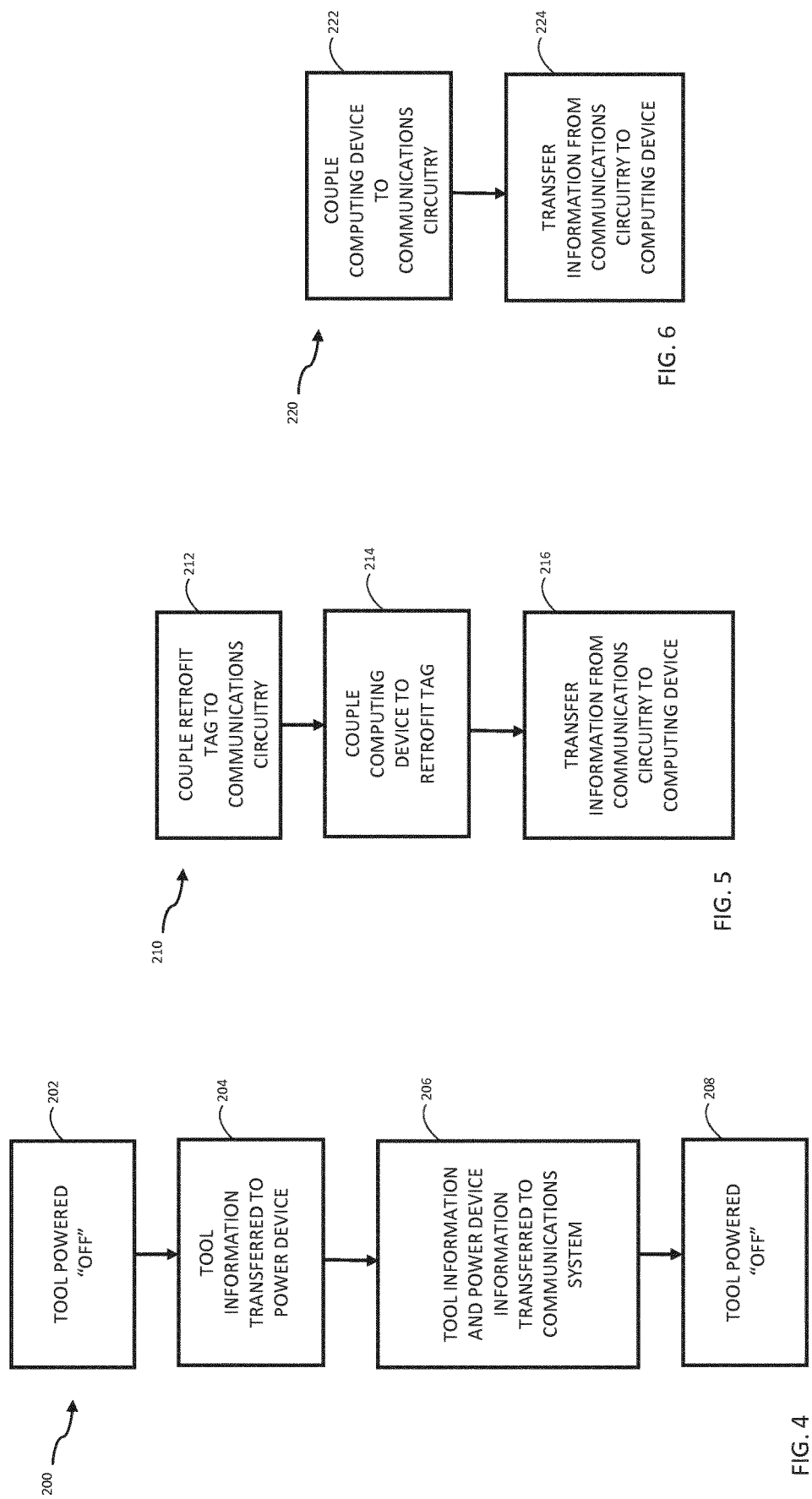

SYSTEMS AND METHODS FOR RETROFIT WIRELESS COMMUNICATIONS IN POWER TOOLS

CROSS-REFERENCE TO RELATED APPLICATIONS

This patent application is the U.S. National Stage of International Patent Application No. PCT/EP2019/065842, filed Jun. 17, 2019, which claims the benefit of U.S. Patent Application No. 62/688,462, filed Jun. 22, 2018, which are each incorporated by reference.

BACKGROUND

The present disclosure relates generally to the field of power tools, and more particularly to retroactively enabling wireless connectivity to power tools.

Electrical devices, such as corded or cordless power tools, may be useful in typical construction job sites. Typically, electrical devices include a motor drive and control circuitry for controlling the motor drive. Certain corded power tools may draw power from a fixed power source, while certain cordless power tools may draw power from a rechargeable power source. In certain situations, it may be beneficial to have bi-directional communication with the corded or cordless power tools via wireless communications. However, not all corded or cordless power tools may be equipped with the necessary hardware for enabling bi-directional communication with an external computing device. Accordingly, it is beneficial to provide for systems and methods for retroactively enabling wireless connectivity to power tools.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a power tool system includes a power tool configured to receive an input power via a cable from a power source. The power tool system also includes a communications system disposed within the power tool. The communications system includes communications circuitry configured to receive operating information related to the power tool. The power tool system includes a retrofit tag removably coupled to an external surface of a housing of the power tool. The retrofit tag is configured to wirelessly couple with the communications system to receive at least a portion of the operating information with a first wireless communication mode. The retrofit tag is configured to transmit at least a portion of the operating information with a second wireless communication mode. The first wireless communication mode is different than the second wireless communication mode.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a method of an embodiment of the power tool system of FIG. 1, where the method includes transferring power tool information and/or power device information from the power tool system to a remote computing device and/or the cloud-based computing device;

FIG. 5 is a method of an embodiment of the power tool system of FIG. 1, where the method includes transferring power tool information and/or power device information via the retrofit tag;

FIG. 6 is a method of an embodiment of the power tool system of FIG. 1, where the method includes transferring power tool information and/or power device information from the communications circuitry to the remote computing device.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
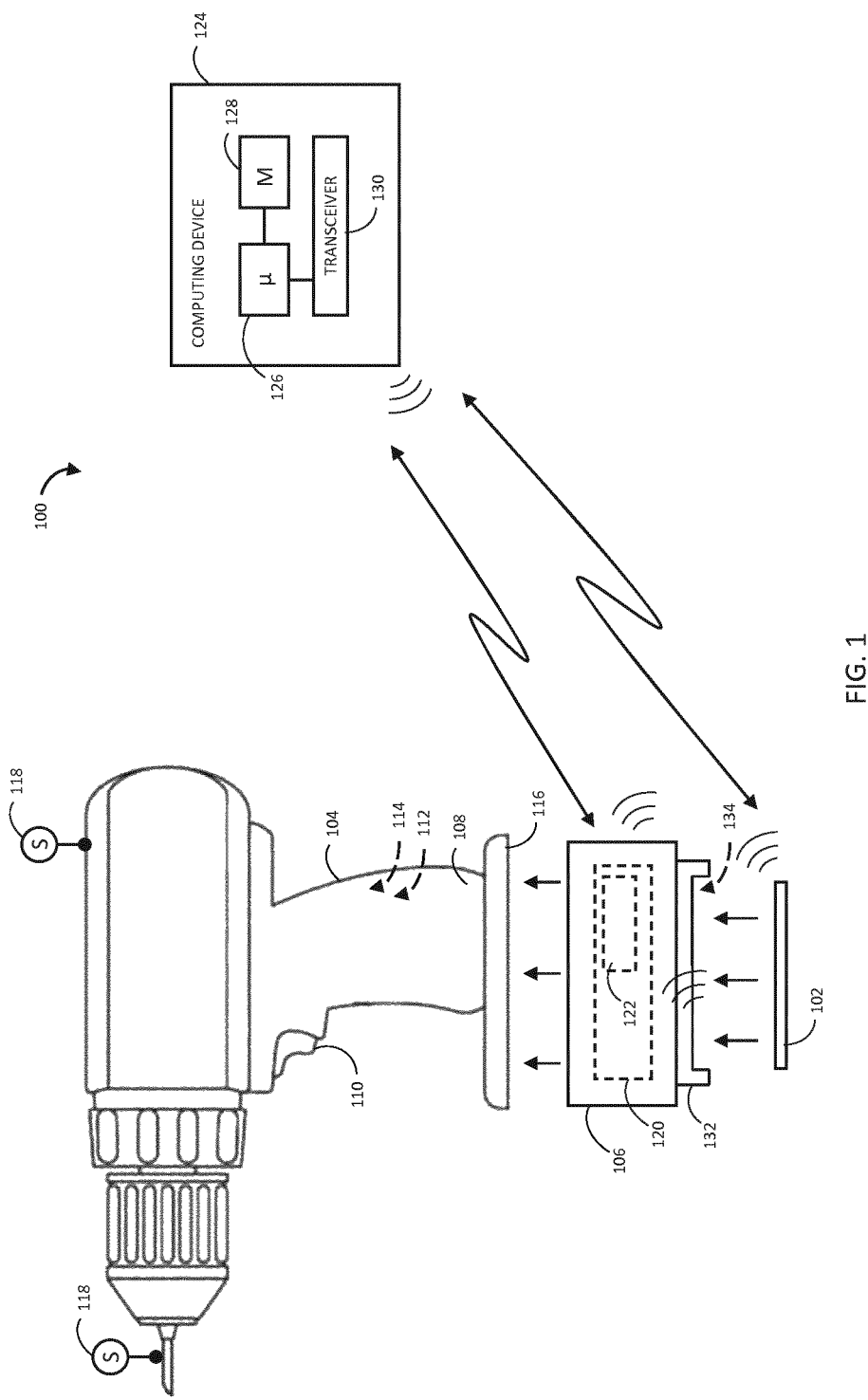
FIG. 1 is a schematic of an embodiment of a power tool system, where the power tool system includes a retrofit tag enabled to enhance wireless connectivity for the power tool.

Turning now to the drawings, FIG. 1 is a schematic of an embodiment of a power tool system 100, where the power tool system 100 includes a retrofit tag 102 configured to enable and and/or enhance wireless connectivity for the power tool 104. Specifically, the power tool 104 may be a cordless hand-held power tool configured to receive power from a power device 106. In certain embodiments, the power tool 104 includes a motor 107, a housing assembly 108, a trigger 110, and control circuity 112 (shown in FIG. 2) that is configured to control one or more tool components 114 (shown in FIG. 2) of the power tool 104. In certain embodiments, the power tool 104 includes one or more sensors 118, such as, for example, safety sensors, position and/or orientation sensors, touch sensors, pressure sensors, accelerometers, temperature sensors, proximity and displacement sensors, image sensors, level sensors, gyroscopes, force sensors, speed sensors, etc.

The power device 106 may be removably coupled to the power tool 104 via the interface 116, and may be configured to provide power to operate the motor 107 of the power tool 104. In certain embodiments, the motor 107 may be any type of electric motor that may receive power from an appropriate source (e.g., electrical, pneumatic, hydraulic, etc.). In the illustrated embodiment, the motor 107 is configured to receive power from the removably coupled power device 106, thereby enabling the power tool 104 with a cordless capability. In certain embodiments, the trigger 110 and the motor 107 may be communicatively coupled to the control circuitry 112, and engaging various functions of the trigger 110 may enable functionality of the power tool 104. For example, engaging the "ON" or "OFF" features of the trigger 110 may provide an input to the control circuitry 112, which in turn may provide a drive signals to the motor 107.

In certain embodiments, engaging the "ON" or "OFF" features of the trigger 110 may indicate to the control circuitry 112 to provide operational information related about the power tool 104 to the power device 106, as further described with respect to FIGS. 2-6. For example, in certain situations, upon engaging the trigger 110 to turn "OFF" the power tool 104, the control circuitry 112 may be configured to transmit operating parameters related to the power tool 104 to the power device 106. In certain situations, operating parameters related to the power tool 104 may include, but are not limited to, unique identification information related to the power tool 104, unique identification information related to the manufacturer, owner, and/or previous owners of the power tool 104, historical information related to the operation of the power tool 104 (e.g., runtime), error codes or alerts triggered by the power tool 104, historical information related to the repair and/or theft of the power tool 104, sensor related information gathered from one or more sensors 118 disposed throughout the power tool 104, information related to the tool components 114, drive signals provided by the control circuitry 112 and/or input signals provided by the trigger 110, and/or the general state of the health of the power tool 104.

In certain embodiments, the housing assembly 108 may include a housing body, a handle, and an interface 116 between the power tool 104 and the power device 106. As noted above, in certain embodiments, the power device 106 may be a rechargeable battery pack that is removably coupled to the power tool 104 via the interface 116. For example, in certain instances, the rechargeable battery pack may be a lithium-ion battery pack of various specifications. In particular, the power device 106 may be an interchangeable device, that may be configured for use with a plurality of power tools. The interface 116 may enable the power device 106 to be communicatively coupled to the power tool 104. For example, the interface 116 may include one or more contact points that allow power to be transferred between the power device 106 and the power tool 104. Further, the interface 116 may include one or more contact points that allow the transfer of information between the control circuitry 112 of the power tool 104 and the power device 106, as further described with respect to FIG. 2.

In certain embodiments, the power device 106 may include power device control circuitry 120 and communications circuitry 122. In certain instances, when the power tool is powered "OFF," the control circuitry 112 of the power tool 104 may be configured to transmit operating parameters from the previous session of operation related to the power tool 104 to the power device control circuitry 120. This information may subsequently be transmitted to the communications circuitry 122 of the power device 106. In certain situations, the power device control circuitry 120 may additionally gather operating parameter information related to the power device 106, such as, but not limited to, unique identification information related to the power device 106, historical information related to the operation of the power device 106 (e.g., cycles of operation, remaining power, etc.), state of health (SOH) status and/or state of charge (SOC) status of the power device 106, error codes triggered by the power tool 106, and/or status of the power device 106 (e.g., battery lock down status). Accordingly, in certain embodiments, the operation information related to both the power tool 104 and the power device 106 are communicated to the communications circuitry 122.

Figure 2:
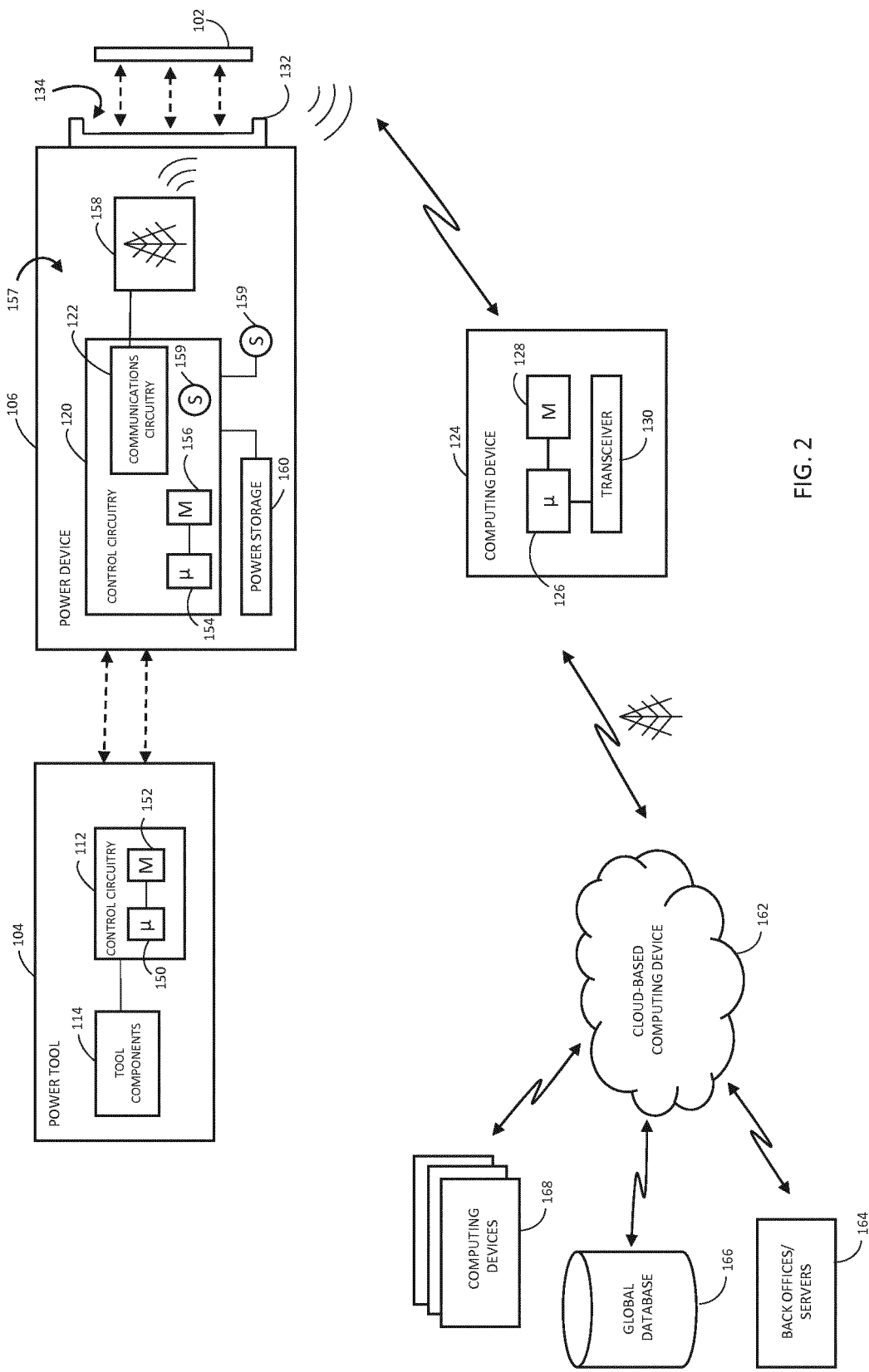
FIG. 2 is a schematic of an embodiment of the power tool system of FIG. 1, where the power tool system includes a cloud-based computing device.

In certain embodiments, the communications circuitry 122, as further described with respect to FIG. 2, may be configured to wirelessly transmit information from the power device 106 to an external computing device 124 (e.g., smartphone, tablet, desktop computer, other processor enabled device, etc.). In certain embodiments, the communications circuitry 122 may be enabled to transmit information via one or more different wireless modes of operation, such as, but not limited to, Bluetooth, Near Field Communication (NFC), Wifi, ZigBee, LoRa, LoRaWAN, Sigfox, Cellular, etc.

As an example, the communications circuitry 122 may be configured to transmit information (e.g., operating parameters related to the power tool 104 and/or the power device 106) to the remote computing device 124 via NFC. In such embodiments, the power device 106 may be equipped with a dynamic passive NFC chip and/or antenna (as illustrated in FIG. 2), which is communicatively paired with a remote computing device 124. After the initial pairing, information may be transmitted via the NFC antenna to the remote computing device 124. The computing device 124 may include a processor 126, a memory 128 communicatively coupled to the processor 126, and transceiver 130. The computing device 124 may utilize these or other components to transfer the received information to other databases or devices, as described with respect to FIG. 2. In certain embodiments, the computing device 124 may additionally transfer information or commands to the power device 106 via the retrofit tag 102. Indeed, the communication described herein may be bi-directional communication.

In certain situations, the mode of wireless communication that the communications circuitry 122 is initially configured for may be an unsuitable or an undesired mode of communication. In some instances, the mode of wireless communication that the communications circuitry 122 is initially configured for may be outdated. Accordingly, in certain embodiments, a retrofit tag 102 may be utilized to enable and/or enhance wireless communications for the communications circuitry 122 of a power device 106. Specifically, in certain embodiments, the power device 106 may be configured with an external feature 132 (e.g., fixture, container, mounting, etc.) having a cavity 134 therein. The retrofit tag 102 may be configured to adapt to the cavity 134, and may be enabled with two or more modes of wireless communication. Accordingly, the retrofit tag 102 may convert the initial mode of wireless communications of the communications circuitry 122 to a secondary mode of wireless communications. Further, the retrofit tag 102 may be configured to transmit information (e.g., operating parameter information related to the power tool 104 and/or the power device 106) from the power device 106 to the remote computing device 124, as further described with respect to FIG. 2. In certain embodiments, the retrofit tag 102 may include additional sensors (e.g., clock, accelerometer, gyroscope, magnet sensor, etc.) that provides additional sensor information, which may be transferred to the remote computing device 124 along with or separately from the operating information.

FIG. 2 is a schematic of an embodiment of the power tool system 100 of FIG. 1, where the power tool system 100 includes a cloud-based computing device 162. In the illustrated embodiment, the power tool 104 includes various tool components 114 and control circuitry 112. As noted above, the control circuity 112 may be configured to receive instructions (e.g., signals) and execute operations of the power tool 104. For example, in certain situations, the control circuitry 112 may be configured to receive input signals from the trigger 110, such as "ON" or "OFF" instructions, instructions to change the speed of operation, data from one or more sensors 118, safety information and/or signals, and/or error signals. Based on the received information, the control circuitry 112 may be configured to transmit operational signals to one or more tool components 114 or sensors 118.

In certain embodiments, the control circuitry 112 may be communicatively coupled to a processor 150 and a memory 152. The processor 150 may be configured to execute instructions stored on the memory 152 to carry out the functions of the power tool 104. The memory 152 may be configured to store instructions that are loadable and executable on the processor 150. In certain embodiments, the memory 152 may be volatile (such as a random access memory (RAM)) and/or non-volatile (such as read-only memory (ROM), flash memory, etc.). The control circuitry 112 may also include additional removable storage and/or non-removable storage including, but not limited to, magnetic storage, optical disks, and/or tape storage. In some implementations, the memory 152 may include multiple different types of memory, such as static random access memory (SRAM), dynamic random access memory (DRAM), or ROM.

In particular, the control circuitry 112 may be configured to receive operating parameters related to the power tool 104 from the tool components 114, the trigger 110, and/or the sensors 118. For example, operating parameters related to the power tool 104 may include, but are not limited to, unique identification information related to the power tool 104, unique identification information related to the manufacturer, owner, and/or previous owners of the power tool 104, historical information related to the operation of the power tool 104 (e.g., runtime), error codes or alerts triggered by the power tool 104, historical information related to the repair and/or theft of the power tool 104, sensor related information gathered from one or more sensors 118 disposed throughout the power tool 104, information related to the tool components 114, drive signals provided by the control circuitry 112 and/or input signals provided by the trigger 110, and/or the general state of the health of the power tool 104. Furthermore, when triggered, the control circuitry 112 may be configured to transmit the received information related to the operating parameters of the power tool 104 to the communications circuitry 122 of the power device 106, as further described with respect to FIG. 4.

In certain embodiments, the power device 106 includes power device control circuitry 120 and a communications system 157. The control circuitry 120 includes a processor 154 and a memory 156. In certain embodiments, the communications circuitry 122 of the communications system 157 is disposed within the power device control circuitry 120. In certain embodiments, an antenna of the communications system 157 may be disposed outside of the control circuitry 120, to enable ease of wireless communications. However, it should be noted that the antenna 158 is not disposed on the inner wall of the housing of the power device 106. Rather, the antenna 158 may be disposed within an inner cavity of the power device 106 (or power tool 104). In certain embodiments, the power device 106 includes power storage 160, such as, for example, a series of Lithium-ion battery cells that are rechargeable. In certain embodiments, the power storage 160 may be coupled to a power storage circuitry (not shown), that is communicatively coupled to the control circuitry and/or the power tool 104. In certain embodiments, the power device 106 and/or the power device control circuitry 120 includes one or more sensors 159, such as, for example, temperature sensors, pressure sensors, power supply sensors, or any of the sensors 118 indicated within the power tool 104.

In particular, the communications system 157 (e.g., the communications circuitry 122 and the antenna 158) may be configured to receive operating parameters related to the power tool 104. Further, the communications system 157 may be configured to receive operating parameters related to the power device 106. In certain embodiments, the communications system 157 may be configured to communicate all and/or a portion of the received operating information directly to the remote computing device 124, as described with respect to FIG. 4. In certain embodiments, the communications system 157 may be configured to transfer all and/or a portion of the received operating information to the remote computing device 124 via the retrofit tag 102. Specifically, as noted above, the retrofit tag 102 may be utilized to enable and/or enhance wireless communications for the communications circuitry 122 of a power device 106. For example, in situations where the communications system 157 is unable to directly communicate with the remote computing device 124, the retrofit tag 102 may be utilized to convert the mode of wireless communication. Accordingly, the retrofit tag 102 may enabled with two modes of communication, and may be utilized to convert an initial mode of wireless communications of the communications circuitry 122 to a secondary mode of wireless communications. Further, the retrofit tag 102 may be configured to transmit information (e.g., operating parameter information related to the power tool 104 and/or the power device 106) from the power device 106 to the remote computing device 124, as further described with respect to FIG. 5-6. For example, in certain examples, the retrofit tag 102 may be configured to receive information from the communications system 157 via NFC, and may be configured to transfer information to the remote computing device 126 via Bluetooth, Wifi, ZigBee, LoRa, LoRaWAN, Sigfox, Cellular, etc.

In certain embodiments, the power device 106 may be configured with an external feature 132 (e.g., fixture, container, mounting, etc.) having a cavity 134 therein. The retrofit tag 102 may be configured to adapt to the cavity 134. In certain embodiments, the retrofit tag 102 may be rectangular in shape, while in other embodiments, the retrofit tag 102 may be configured in any shape (e.g., square, triangular, circular, octagonal, etc.). Furthermore, the cavity 134 may be shaped to receive the retrofit tag 102. In certain embodiments, the retrofit tag 102 may be removably coupled to the external feature 132 within the cavity 134 via an attachment means (e.g., adhesive, tape, snap-on, magnet features, screws, nails, press-fit feature, etc.). It should be noted that that attachment means does not impact the functionality of the retrofit tag 102, or interfere in the communications process.

The remote computing device 124 (e.g., smartphone, computer, tablet, or any process enabled device) may include a processor 124 configured to execute instructions stored on a memory 128. Further, the remote computing device 124 may include a transceiver 130 that is configured to communicate the received information to a cloud-based computing device 162 via WiFi (e.g., Institute of Electrical and Electronics Engineers [IEEE] 802.11X, cellular conduits (e.g., high speed packet access [HSPA], HSPA+, long term evolution [LTE], WiMax), near field communications (NFC), Bluetooth, personal area networks (PANs), and the like. The cloud-based computing device 162 may be a service provider providing cloud analytics, cloud-based collaboration and workflow systems, distributed computing systems, expert systems and/or knowledge-based systems. In certain embodiments, the cloud-based computing device 162 may be a data repository that is coupled to an internal or external global database 166.

Further, in certain embodiments, the global database 166 may allow computing devices 168 to retrieve information stored within for additional processing or analysis. Indeed, the cloud-based computing device may be accessed by a plurality of systems (computing devices 168 and/or computing devices from back offices/servers 164) from any geographic location, including geographic locations remote from the physical locations of the systems. Accordingly, the cloud 162 may enable advanced collaboration methods between parties in multiple geographic areas, provide multi-party workflows, data gathering, and data analysis, which may increase the wireless capabilities of connectivity of the power tool 104.

Figure 3:
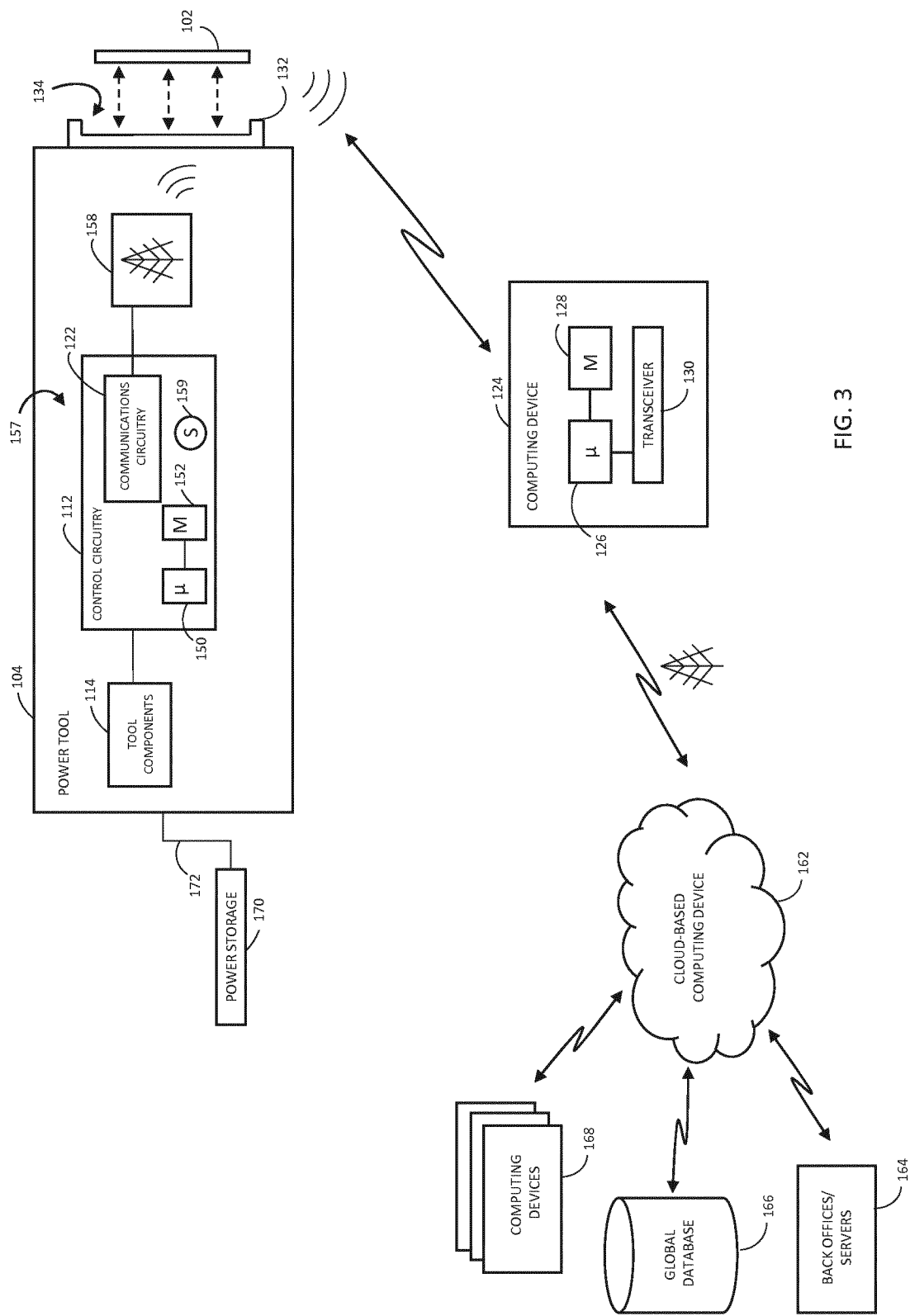
FIG. 3 is a schematic of an embodiment of the power tool system of FIG. 1, where the power tool system includes a retrofit tag coupled to the power tool to enhance wireless connectivity for the power tool.

FIG. 3 is a schematic of an embodiment of the power tool system 100 of FIG. 1, where the power tool system includes the retrofit tag 102 removably coupled to the power tool to enhance wireless connectivity for the power tool 104. Specifically, in certain embodiments, the power tool 104 may be a corded power tool 104 that is connected to a power source 170 via a cable 172. The power tool 104 may be configured to receive input power from the power source 170, which may be an AC/DC power grid, an engine/generator set, a battery, or a combination thereof. In these embodiments, the power tool 104 may be equipped with the communications system 157 (e.g., the communications circuitry 122 and the antenna 158). For example, the control circuitry 112 may include the communications circuitry 122 of the communications system 157. Further, the antenna 158 may be disposed within the power tool 104, though it should be noted that the antenna 158 is not disposed on the inner wall of the housing of the power tool 104.

In particular, the communications system 157 (e.g., the communications circuitry 122 and the antenna 158) may be configured to receive operating parameters related to the power tool 104. In certain embodiments, the communications system 157 may be configured to communicate all and/or a portion of the received operating information directly to the remote computing device 124. In certain embodiments, the communications system 157 may be configured to transfer all and/or a portion of the received operating information to the remote computing device 124 via the retrofit tag 102.

Specifically, in certain embodiments, the retrofit tag 102 may be utilized to enable and/or enhance wireless communications for the communications circuitry 122 of the power tool 104. For example, in situations where the communications system 157 is unable to directly communicate with the remote computing device 124, the retrofit tag 102 may be utilized to convert the mode of wireless communication. Accordingly, the retrofit tag 102 may enabled with two modes of communication, and may be utilized to convert an initial mode of wireless communications of the communications circuitry 122 to a secondary mode of wireless communications. Further, the retrofit tag 102 may be configured to transmit information (e.g., operating parameter information related to the power tool 104) from the power tool 104 to the remote computing device 124. For example, in certain examples, the retrofit tag 102 may be configured to receive information from the communications system 157 via NFC, and may be configured to transfer information to the remote computing device 126 via Bluetooth, Wifi, ZigBee, LoRa, LoRaWAN, Sigfox, Cellular, etc.

Accordingly, in such embodiments, the power tool 104 may be configured with the external feature 132 (e.g., fixture, container, mounting, etc.) having a cavity 134 therein. The retrofit tag 102 may be configured to adapt to the cavity 134. In certain embodiments, the retrofit tag 102 may be rectangular in shape, while in other embodiments, the retrofit tag 102 may be configured in any shape (e.g., square, triangular, circular, octagonal, etc.). Furthermore, the cavity 134 may be shaped to receive the retrofit tag 102. In certain embodiments, the retrofit tag 102 may be removably coupled to the external feature 132 within the cavity 134 via an attachment means (e.g., adhesive, tape, snap-on, magnet features, screws, nails, press-fit feature, etc.). It should be noted that that attachment means does not impact the functionality of the retrofit tag 102, or interfere in the communications process.

FIG. 4 is a method 200 of an embodiment of the power tool system 100 of FIG. 1, where the method 200 includes transferring power tool information and/or power device information from the power tool 104 and the power device 106 to a remote computing device 124 and/or the cloud-based computing device 162. First, the method 200 includes powering the power tool 104 "OFF" (block 202), which triggers the control circuitry 112 of the power tool 104 to transfer tool information (e.g., operating parameters related to the power tool 104) to the power device 106 (block 204). Specifically, operating parameters related to the power tool 104, may include, for example, unique identification information related to the power tool 104, unique identification information related to the manufacturer, owner, and/or previous owners of the power tool 104, historical information related to the operation of the power tool 104 (e.g., runtime), error codes or alerts triggered by the power tool 104, historical information related to the repair and/or theft of the power tool 104, sensor related information gathered from one or more sensors 118 disposed throughout the power tool 104, information related to the tool components 114, drive signals provided by the control circuitry 112 and/or input signals provided by the trigger 110, and/or the general state of the health of the power tool 104.

In certain embodiments, the method 200 includes transferring all or a portion of the received power tool information and/or all or a portion of the power device 106 information (e.g., operating parameters related to the power tool 104 and/or the power device 106) to the communications system 157 (block 206). The operating parameters related to the power device 106 include, for example, unique identification information related to the power device 106, historical information related to the operation of the power device 106 (e.g., cycles of operation, remaining power, etc.), SOH status and/or SOC status of the power device 106, error codes triggered by the power tool 106, and/or status of the power device 106 (e.g., battery lock down status). In certain embodiments, the communications system 157 may be configured to transfer all or a portion of the received information (e.g., power tool 104 and/or power device 106) directly to the remote computing device via wireless communication. In certain embodiments, the wireless communication may be Bluetooth, Near Field Communication (NFC), Wifi, ZigBee, LoRa, LoRaWAN, Sigfox, Cellular, etc. In other embodiments, the communications system 157 may utilize a retrofit tag 102 to transfer information, as described below with respect to FIGS. 5 and 6.

FIG. 5 is a method 210 of an embodiment of the power tool system 100 of FIG. 1, where the method 210 includes transferring power tool information and/or power device information via the retrofit tag 102 (block 212). The method 210 includes removably coupling and wirelessly pairing the retrofit tag 102 to the communications circuity 157 of the power device 106 and/or the power tool 104. In certain embodiments, the retrofit tag 102 may be coupled with wires (e.g., pins) to the communications circuitry 157. For example, the retrofit tag 102 may be mechanically attached to an external surface of the housing of the power device 106 and/or the power tool 104 via any attachment means. Further, the retrofit tag 102 may be wirelessly paired with the communications system 157 via any first mode of wireless communication (e.g., Bluetooth, Near Field Communication (NFC), Wifi, ZigBee, LoRa, LoRaWAN, Sigfox, Cellular, etc.). The method 210 similarly includes removably wirelessly pairing the remote computing device 124 to the retrofit tag 102 via any second mode of wireless communication (e.g., Bluetooth, Near Field Communication (NFC), Wifi, ZigBee, LoRa, LoRaWAN, Sigfox, Cellular, etc.) (block 214). Indeed, in this manner, the retrofit tag 102 may be equipped with two or more modes of wireless communication, thereby allowing the retrofit tag 102 to act as a converter. In certain embodiments, the method 210 includes transferring all or a portion of the received power tool information and/or all or a portion of the power device 106 information (e.g., operating parameters related to the power tool 104 and/or the power device 106) to the remote computing device 124 via the retrofit tag 102. Further, in certain embodiments, the method 210 includes supplementing the received power tool information/power device 106 information with retrofit tag information gathered from one or more retrofit tag sensors (e.g., clock, accelerometer, gyroscope, magnet sensor, etc.).

FIG. 6 is a method 220 of an embodiment of the power tool system 100 of FIG. 1, where the method 220 includes transferring power tool information and/or power device information (e.g., operating parameters related to the power tool 104 and/or the power device 106) from the communications system 157 to the remote computing device 124. As noted above, in certain embodiments, the communications system 157 includes the communications circuitry 122 and the antenna 158. Specifically, the communications circuitry 122 may be disposed within the control circuitry 120 and/or the control circuitry 112, and the antenna 158 may be disposed outside and communicatively coupled to the communications circuitry 122. In particular, it should be noted that the communications system 157 is disposed proximate to the power device control circuitry 120 and/or the power tool control circuitry 112, and away from the inner walls of the power device 106.

In certain embodiments, the method 220 includes coupling the remote computing device 124 to the communications circuitry 122 of the communications system 157 (block 222). It should be noted that the remote computing device 124 may be coupled to the communications circuitry 122 of the power tool 104 and/or the power device 106, depending on whether the power tool system 100 include a corded or cordless power tool 104. Further, the method 220 includes transferring power tool information and/or power device information (e.g., operating parameters related to the power tool 104 and/or the power device 106) from the communications circuitry 122 to the computing device 124 via the antenna 158 (block 224).

Figure 8:
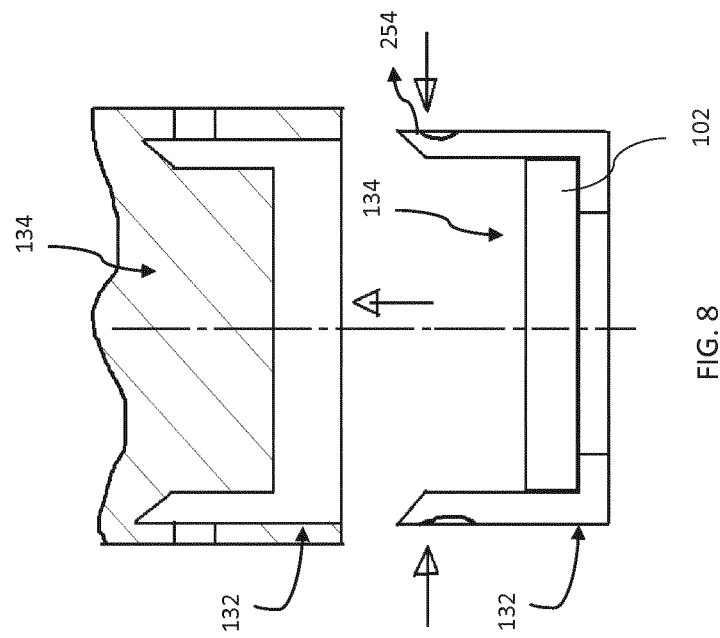
FIG. 7-10 are embodiments of the retrofit tag of the power tool system of FIG. 1, where the retrofit tag is coupled to an external feature 132 of the power tool or the power device.
Figure 7:
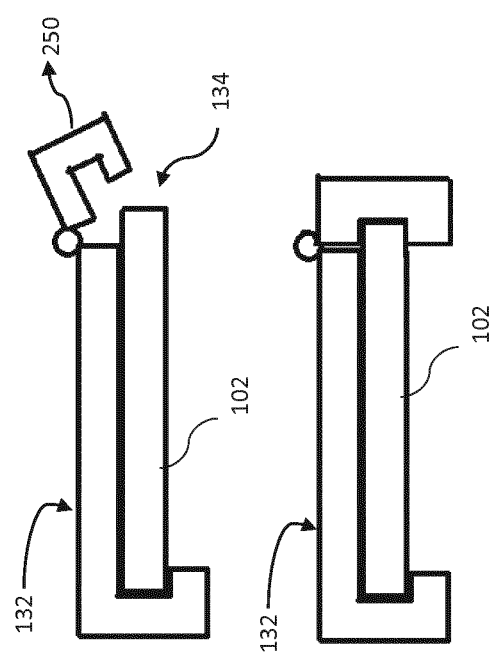
Figure 10:
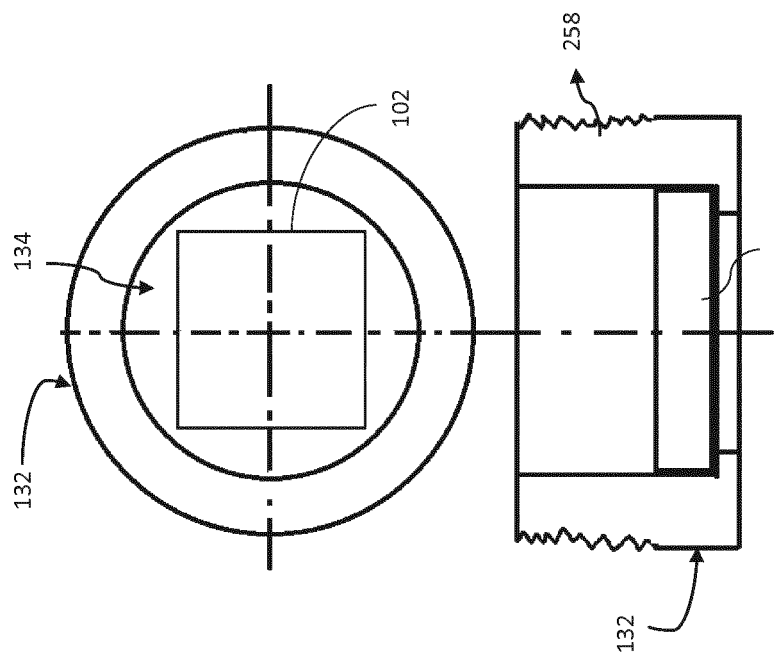
Figure 9:
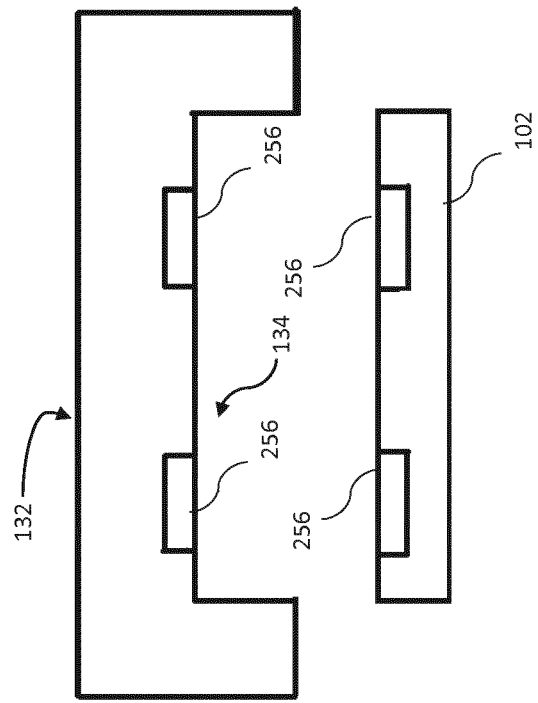

FIG. 7-10 are embodiments of the retrofit tag 102 of the power tool system 100 of FIG. 1, where the retrofit tag 102 is coupled to an external feature 132 of the power tool 104 and/or the power device 106. As noted above with respect to FIGS. 1-3, the power tool 104 and/or the power device 106 may be configured with an external feature 132 (e.g., fixture, container, mounting, etc.) having a cavity 134 therein. The retrofit tag 102 may be configured to adapt to the cavity 134, and may be removably or permanently coupled to the cavity 134. In certain embodiments, as illustrated in FIGS. 1-3, the retrofit tag 102 may be fixed with an adhesive or tape. In certain embodiments, as illustrated by FIG. 7, the external feature 132 may include a snap-on feature 250 that is configured to open and close to secure the retrofit tag 102. In certain embodiments, as illustrated by FIG. 8, the external feature 132 may include a clip-lock feature 254 that is configured to be squeezed in to open and close to secure the retrofit tag 102. In certain embodiments, as illustrated by FIG. 9, the external feature 132 and the retrofit tag 102 may include one or more magnet features 256 that are configured to secure the retrofit tag 102. In certain embodiments, as illustrated by FIG. 10, the external feature 132 may include a screw-in feature 258 that is configured to receive and secure the retrofit tag 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power tool system, comprising:
a power tool configured to receive an input power via a cable from a power source;
a communications system disposed within the power tool, wherein the communications system comprises communications circuitry configured to receive operating information related to the power tool; and
a retrofit tag removably coupled to an external surface of a housing of the power tool, wherein the retrofit tag is configured to wirelessly couple with the communications system to receive at least a portion of the operating information with a first wireless communication mode, and wherein the retrofit tag is configured to transmit at least a portion of the operating information with a second wireless communication mode, and wherein the first wireless communication mode is different than the second wireless communication mode.

2. The power tool system of claim 1, wherein the retrofit tag is removably wirelessly paired with an external computing device, and wherein the retrofit tag is configured to transmit at least a portion of the operating information to the external computing device via the second wireless communication mode.

3. The power tool system of claim 2, wherein the external computing device is connected to a cloud-based computing device, and wherein the external computing device is configured to transfer at least a portion of the operating information to the cloud-based computing device.

4. The power tool system of claim 1, wherein the communications system comprises an antenna configured to receive the operating information from the communications circuitry.

5. The power tool system of claim 4, wherein the antenna is disposed within an interior cavity of the power tool.

6. The power tool system of claim 5, wherein the retrofit tag is configured to receive the at least a portion of the operating information from the antenna.

7. The power tool system of claim 1, wherein the external surface of the housing comprises an external feature comprising a receiving cavity, and wherein the retrofit tag is configured to adapt to the receiving cavity.

8. The power tool system of claim 7, wherein the retrofit tag is removably coupled to the external feature with an adhesive, a tape, a snap-on feature, a clip-lock feature, a magnetic feature, or a combination thereof.

9. The power tool system of claim 1, wherein the retrofit tag comprises a clock, an accelerometer, a gyroscope, a magnet sensor, or a combination thereof.

10. The power tool system of claim 1, wherein the first and second wireless communication modes comprise Bluetooth, Near Field Communication (NFC), Wifi, ZigBee, Cellular, LoRa, LoRaWAN, Sigfox or a combination thereof.

11. The power tool system of claim 1, wherein the operating information comprises unique identification information related to the power tool or unique identification information related to the manufacturer, owner, and/or previous owners of the power tool, or a combination thereof.

12. The power tool system of claim 1, wherein the operating information comprises historical information related to the operation of the power tool, historical information related to the repair and/or theft of the power tool, historical information related to error codes or alerts triggered by the power tool, or a combination thereof.

13. The power tool system of claim 1, wherein the operating information comprises sensor related information gathered from one or more sensors disposed throughout the power tool, information related to tool components of the power tool, or a combination thereof.

14. The power tool system of claim 13, wherein the one or more sensors, safety sensors, position and/or orientation sensors, touch sensors, pressure sensors, accelerometers, temperature sensors, proximity and displacement sensors, image sensors, level sensors, gyroscopes, force sensors, speed sensors, or a combination thereof.

15. The power tool system of claim 1, wherein the operating information comprises drive signals provided by control circuitry of the power tool and/or input signals provided by a trigger of the power tool, the general state of the health of the power tool, or a combination thereof.

16. The power tool system of claim 1, wherein one or more command signals are transmitted from the external computing device to the power tool via the retrofit tag with the first and second modes of communication.

17. The power tool system of claim 1, wherein one or more command signals are transmitted from the cloud-based computing device to the power tool via the retrofit tag.

* * * * *